United States Patent
Peng et al.

(10) Patent No.: US 10,640,698 B2
(45) Date of Patent: May 5, 2020

(54) ETHOXYLATED AMINES FOR USE IN SUBTERRANEAN FORMATIONS

(71) Applicant: Halliburton Energy Services, Inc., Houston, TX (US)

(72) Inventors: Yang Peng, Kingwood, TX (US); Zhiwei Yue, Sugar Land, TX (US); Kai He, Houston, TX (US); Jayant Rane, Houston, TX (US); Liang Xu, The Woodlands, TX (US)

(73) Assignee: Multi-Chem Group, LLC, Houston, TX (US)

( * ) Notice: Subject to any disclaimer, the term of this patent is extended or adjusted under 35 U.S.C. 154(b) by 0 days.

(21) Appl. No.: 15/765,166

(22) PCT Filed: Nov. 16, 2015

(86) PCT No.: PCT/US2015/060924
§ 371 (c)(1),
(2) Date: Mar. 30, 2018

(87) PCT Pub. No.: WO2017/086919
PCT Pub. Date: May 26, 2017

(65) Prior Publication Data
US 2018/0265766 A1    Sep. 20, 2018

(51) Int. Cl.
*C09K 8/584*    (2006.01)
*C09K 8/68*    (2006.01)
*C09K 8/60*    (2006.01)

(52) U.S. Cl.
CPC .............. *C09K 8/584* (2013.01); *C09K 8/604* (2013.01); *C09K 8/68* (2013.01); *C09K 2208/32* (2013.01)

(58) Field of Classification Search
CPC ........... C09K 8/584; C09K 8/68; C09K 8/604
(Continued)

(56) References Cited

U.S. PATENT DOCUMENTS 4,324,669 A * 4/1982 Norman .................... C01B 7/01
166/282
4,382,006 A    5/1983 Horodysky
(Continued)

FOREIGN PATENT DOCUMENTS

| CA | 2860429 C | 9/2013 |
| CA | 2911521 A1 | 11/2014 |
| CA | 2996174 A1 | 3/2017 |

OTHER PUBLICATIONS

Wu, Y., et al. "Alkyl polyglycoside-sorbitan ester formulations for improved oil recovery." Tenside Surfactants Detergents 475 (2010): 280-287.
(Continued)

*Primary Examiner* — Zakiya W Bates
*Assistant Examiner* — Ashish K Varma
(74) *Attorney, Agent, or Firm* — Tenley Krueger; Baker Botts L.L.P.

(57) ABSTRACT

Methods for treating subterranean formations are provided. In one embodiment, the methods comprise providing a treatment fluid comprising an aqueous base fluid and a surfactant comprising an ethoxylated amine or derivative thereof; introducing the treatment fluid into a wellbore penetrating at least a portion of a subterranean formation; and producing fluids from the wellbore during or subsequent to introducing the treatment fluid into the wellbore.

19 Claims, 5 Drawing Sheets

(58) Field of Classification Search
USPC .................................................... 166/270.1
See application file for complete search history.

(56) References Cited

U.S. PATENT DOCUMENTS

| | | | |
|---|---|---|---|
| 4,548,744 | A | 10/1985 | Connor |
| 5,979,555 | A | 11/1999 | Gadberry et al. |
| 6,035,936 | A | 3/2000 | Whalen |
| 6,929,070 | B2 | 8/2005 | Fu et al. |
| 7,503,332 | B2 | 3/2009 | Gross et al. |
| 8,815,785 | B2 | 8/2014 | Welton et al. |
| 9,102,862 | B2 * | 8/2015 | Raney .................... C09K 8/584 |
| 2002/0039972 | A1 | 4/2002 | Allan et al. |
| 2006/0046948 | A1 | 3/2006 | Tang et al. |
| 2008/0039345 | A1 | 2/2008 | Kippie et al. |
| 2008/0078546 | A1 * | 4/2008 | Welton .................... C09K 8/06 166/278 |
| 2011/0174492 | A1 * | 7/2011 | Robb .................... C09K 8/524 166/308.2 |
| 2013/0180723 | A1 | 7/2013 | Crick et al. |
| 2014/0256603 | A1 | 9/2014 | Muthusamy et al. |
| 2014/0345870 | A1 | 11/2014 | Vo et al. |
| 2015/0080272 | A1 | 3/2015 | Muthusamy et al. |

OTHER PUBLICATIONS

Iglauer, Stefan, et al. "Alkyl polyglycoside surfactant-alcohol cosolvent formulations for improved oil recovery" Colloid and Surfaces A: Physicochemical and Engineering Aspects 339.1-3 (2009): 48-59.

Alsabagh, A. M., M. A. Migahed, and Hayam S. Awad. "Reactivity of polyester aliphatic amine surfactants as corrosion inhibitors for carbon steel in formation water (deep well water)." Corrosion Science 48.4 (2006): 813-828.

Migahed, M. A., et al. "Corrosion inhibition of carbon steel in acid chloride solution using ethoxylated fatty alkyl amine surfactants." Journal of Applied Electrochemistry 36.4 (2006): 395-402.

International Search Report and Written Opinion issued in related PCT Application No. PCT/US2015/060924 dated Aug. 5, 2016, 16 pages.

International Preliminary Report on Patentability in related PCT application No. PCT/US2015/060924 dated May 31, 2018, 13 pages.

Examiner's letter issued in related CA application No. 2,998,843 received from foreign agent on Feb. 1, 2019, 5 pages.

* cited by examiner

ETHOXYLATED AMINES FOR USE IN SUBTERRANEAN FORMATIONS

CROSS-REFERENCE TO RELATED APPLICATION

The present application is a U.S. National Stage Application of International Application No. PCT/US2015/060924 filed Nov. 16, 2015, which is incorporated herein by reference in its entirety for all purposes.

BACKGROUND

The present disclosure relates to methods for treating subterranean formations, and more specifically, methods for treating subterranean formations with treatment fluids comprising surfactants.

Hydrocarbons, such as oil and gas, are commonly obtained from subterranean formations that may be located onshore or offshore. The development of subterranean operations and the processes involved in removing hydrocarbons from a subterranean formation typically involve a number of different steps such as, for example, drilling a wellbore at a desired well site, treating the wellbore to optimize production of hydrocarbons, and performing the necessary steps to produce and process the hydrocarbons from the subterranean formation.

Surfactants are widely used in treatment fluids for drilling operations and other well treatment operations, including hydraulic fracturing and acidizing (both fracture acidizing and matrix acidizing) treatments. Surfactants may also be used in enhanced or improved oil recovery operations. Many variables may affect the selection of a surfactant for use in such treatments and operations, such as interfacial surface tension, wettability, compatibility with other additives (such as other additives used in acidizing treatments), and emulsification tendency. Surfactants are an important component in treatment fluids for ensuring higher productivity from unconventional oil and gas formations. Surfactants may provide more effective fluid loss control, fluid flowback efficiency, and oil recovery. For example, surfactants may improve oil recovery by reducing interfacial tension, altering the wettability of the subterranean formation, and/or stabilizing an emulsion. However, conventional surfactants may present environmental, health, and safety concerns. In addition, conventional surfactants may be sensitive to changes in pH, temperature, and salinity.

BRIEF DESCRIPTION OF THE DRAWINGS

These drawings illustrate certain aspects of some of the embodiments of the present disclosure, and should not be used to limit or define the claims.

Figure 1:
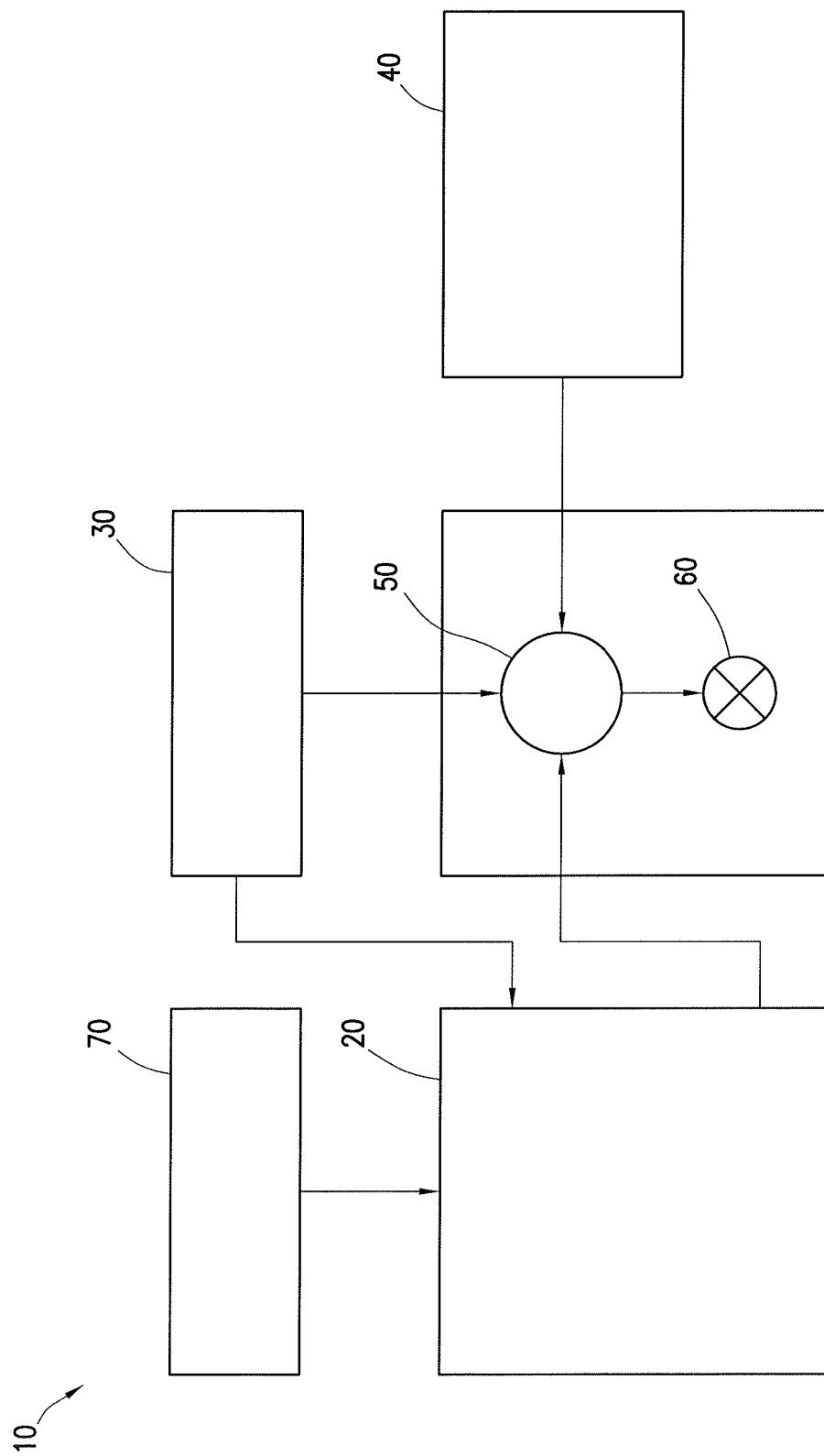
FIG. 1 is a diagram illustrating an example of a fracturing system that may be used in accordance with certain embodiments of the present disclosure.

While embodiments of this disclosure have been depicted, such embodiments do not imply a limitation on the disclosure, and no such limitation should be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DESCRIPTION OF CERTAIN EMBODIMENTS

Illustrative embodiments of the present disclosure are described in detail herein. In the interest of clarity, not all features of an actual implementation may be described in this specification. It will of course be appreciated that in the development of any such actual embodiment, numerous implementation specific decisions may be made to achieve the specific implementation goals, which may vary from one implementation to another. Moreover, it will be appreciated that such a development effort might be complex and time consuming, but would nevertheless be a routine undertaking for those of ordinary skill in the art having the benefit of the present disclosure.

The present disclosure relates to methods for treating subterranean formations. Particularly, the present disclosure relates to methods for the use of ethoxylated amines in subterranean formations.

More specifically, the present disclosure provides methods that comprise: providing a treatment fluid comprising: an aqueous base fluid, and a surfactant comprising an ethoxylated amine or derivative thereof; introducing the treatment fluid into a wellbore penetrating at least a portion of a subterranean formation; and producing fluids from the wellbore during or subsequent to introducing the treatment fluid into the wellbore. In certain embodiments, the present disclosure provide methods comprising introducing the treatment fluid into a wellbore penetrating at least a portion of a subterranean formation at or above a pressure sufficient to create or enhance one or more fractures in the subterranean formation.

Among the many potential advantages to the methods and compositions of the present disclosure, only some of which are alluded to herein, the methods and compositions of the present disclosure may provide surfactants for use in subterranean formations that are safer, less toxic, and/or more effective than certain other surfactants used in subterranean operations. Ethoxylated amine surfactants may be non-toxic and may be more stable as they are less sensitive to temperature, pH, and salinity variations than conventional surfactants. Another advantage may be a synergistic effect of an ethoxylated amine surfactant with other surfactants (e.g., other ethoxylated surfactants, alkyl polyglycoside surfactants) or solvents in the fluid, which may result in lower interfacial tension than the surfactants may achieve independently or without the solvents. In addition to surfactant functionality, ethoxylated amines may also serve as a corrosion inhibitor.

As used herein, the term "ethoxylated amine surfactant" refers to surfactants comprising an ethoxylated amine or derivative thereof. Ethoxylated amines are amines comprising ethylene oxide. Examples of ethoxylated amines that may be suitable for certain embodiments of the present disclosure include, but are not limited to compounds having the following general chemical structure:

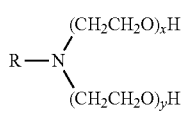

where R represents an alkyl group, and x and y are non-zero integers. In certain embodiments, R may comprise a substituted, unsubstituted, linear, branched, cyclic, or acyclic alkyl group from C1 to C20. Variables x and y may be the same or different and may be an integer from 1 to 25. For example, in some embodiments, R is an alkyl group from C10-C18 and the sum of x and y is 2-50. In certain embodiments, the sum of x and y is 2-20. In some embodiments, the ethoxylated amine is a tertiary amine having one alkyl group and two or more polyoxyethylene groups attached to the nitrogen atom. In some embodiments, the methods and compositions of the present disclosure may comprise an ethoxylated amine derivative.

In certain embodiments, an ethoxylated amine surfactant may be present in a treatment fluid of the present disclosure in an amount from about $1 \times 10^{-5}$ gallons per thousand gallons of treatment fluid (gpt) up to about 50 gpt. In some embodiments, the ethoxylated amine surfactant may be present in a treatment fluid of the present disclosure in an amount from about 0.1 gpt up to about 50 gpt. In some embodiments, the ethoxylated amine surfactant may be present in a treatment fluid of the present disclosure in an amount from about 0.1 gpt up to about 10 gpt.

In certain embodiments, additional surfactants may be used together with the ethoxylated amine surfactant. In some embodiments, the ethoxylated amine surfactant may have a synergistic effect with the additional surfactants. For example, in some embodiments, the ethoxylated amine may help disperse the additional surfactants in the fluid. Examples of suitable additional surfactants include, but are not limited to alkyl polyglycosides, alkoxylated alkyl alcohols and salts thereof, alkoxylated alkyl phenols and salts thereof, alkyl sulfonates, aryl sulfonates, sulfates, phosphates, carboxylates, polyoxyalkyl glycols, fatty alcohols, polyoxyethylene glycol sorbitan alkyl esters, sorbitan alkyl esters, polysorbates, glucosides, quaternary amine compounds, amine oxide surfactants, and any combination thereof.

In certain embodiments, a solvent may be used together with the ethoxylated amine surfactant. In some embodiments, the ethoxylated amine surfactant may have a synergistic effect with the solvent. In certain embodiments, a treatment fluid of the present disclosure may comprise an aqueous base fluid and a solvent. In some embodiments, this may result in lower interfacial tension than the ethoxylated amine surfactant or solvent may achieve independently. In certain embodiments, the solvent may comprise any suitable solvent or combination thereof. Examples of solvents suitable for some embodiments of the present disclosure include, but are not limited to a non-aqueous solvent, a non-aromatic solvent, an alcohol, glycerol, carbon dioxide, isopropanol, or any combination or derivative thereof. Examples of non-aromatic solvents that may be suitable for use in certain embodiments of the present disclosure include, but are not limited to, an ethoxylated alcohol, an alkoxylated alcohol, a glycol ether, a disubstituted amide, RHODIASOLV® MSOL (a mixture of glycerine and acetone available from Solvay in Houston, Tex.), MUSOL® (isopropylidene glycerol, available from Halliburton in Houston, Tex.), triethanolamine, ethylenediaminetetraacetic acid, N,N-dimethyl 9-decenamide, soya methyl ester, canola methyl ester, STEPOSOL® C-42 (a mixture of methyl laurate and methyl myristate, available from Stepan in Northfield, Ill.), STEPOSOL® SC (a mixture of methyl soyate and ethyl lactate, available from Stepan in Northfield, Ill.), any combination, and any derivative thereof.

In certain embodiments, the surfactants of the present disclosure, either alone or in conjunction with other additives, may increase production of hydrocarbon fluids from unconventional hydrocarbon formations. Examples of unconventional reservoirs include, but are not limited to reservoirs such as tight sands, shale gas, shale oil, coalbed methane, tight carbonate, and gas hydrate reservoirs. Surfactants may affect many variables in subterranean treatments and operations, such as interfacial/surface tension, wettability, compatibility with other additives (such as other additives used in acidizing treatments), and emulsification tendency.

Without limiting the disclosure to any particular theory or mechanism, it is believed that surfactants of the present disclosure generate a short-lived oil-in-water emulsion, aiding oil solubilization and mobilization.

In some embodiments, the surfactants of the present disclosure may act as a flowback aid. Flowback aids may reduce capillary pressure, oil blocks, and/or water blocks, improving the kinetics of flowback and minimizing the amount of fracturing fluid left behind in the formation. In addition, flowback aids may aid in the "clean up" of a proppant pack, and/or accelerate the flow of hydrocarbons through the formation and a proppant pack.

As used herein, a "water block" generally refers to a condition caused by an increase in water saturation in the near-wellbore area. A water block may form when the near-wellbore area is exposed to a relatively high volume of filtrate from the drilling fluid. In some embodiments, increased presence of water may cause clay present in the formation to swell and reduce permeability and/or the water may collect in pore throats, resulting in a decreased permeability due to increased capillary pressure and cohesive forces.

As used herein, an "oil block" generally refers to a condition in which an increased amount of oil saturates the area near the wellbore. Due to the wettability of the subterranean formation and the resulting capillary pressure, oil may reduce the permeability of the subterranean formation to the flow of fluids, including oil and water. Without limiting the disclosure to any particular theory or mechanism, it is believed that the compositions and methods described herein may remove a water or oil block by removing at least a portion of the water and/or oil in the near wellbore area and/or altering the wettability of the subterranean formation. For example, in certain embodiments, the formation surface may be oil wet. By altering the wettability of the surface of a subterranean formation to be more water wet, the surface of the formation may be more compatible with injection water and other water-based fluids. In certain embodiments, the methods and compositions of the present disclosure may also reduce interfacial tension between the fluid in the formation and the surfaces of the formation.

In some embodiments, the methods and compositions of the present disclosure may directly or indirectly reduce capillary pressure in the porosity of the formation. Reduced capillary pressure may lead to increased water and/or oil drainage rates. In some embodiments, improved water-drainage rates may allow a reduction in existing water blocks, as well as a reduction in the formation of water blocks. In certain embodiments, the methods and compositions of the present disclosure may allow for enhanced water, oil, and/or other fluid recovery.

In certain embodiments, the ethoxylated amines of the present disclosure may also serve as a corrosion inhibitor. For example, the methods of the present disclosure may inhibit corrosion in a wellbore. In some embodiments, the ethoxylated amines may prevent corrosion during the period of flow back and initial production.

In some embodiments, the methods and compositions of the present disclosure may provide treatment fluids comprising surfactants that are more stable to variations in temperature, pH, and salinity than conventional surfactant compositions. For example, in some embodiments, the ethoxylated amine or ethoxylated amine derivative surfactant may provide stable interfacial tension across a variety of temperatures, pH levels, and salinities.

In certain embodiments of the present disclosure, ethoxylated amine surfactants, treatment fluids, or related additives of the present disclosure may be introduced into a subterranean formation, a wellbore penetrating a subterranean formation, tubing (e.g., pipeline), and/or a container using any method or equipment known in the art. Introduction of the ethoxylated amines, treatment fluids, or related additives of the present disclosure may in such embodiments include delivery via any of a tube, umbilical, pump, gravity, and combinations thereof. Additives, treatment fluids, or related compounds of the present disclosure may, in various embodiments, be delivered downhole (e.g., into the wellbore) or into top-side flowlines/pipelines or surface treating equipment.

The compositions used in the methods and compositions of the present disclosure may comprise any aqueous base fluid known in the art. The term "base fluid" refers to the major component of the fluid (as opposed to components dissolved and/or suspended therein), and does not indicate any particular condition or property of that fluids such as its mass, amount, pH, etc. Aqueous fluids that may be suitable for use in the methods and compositions of the present disclosure may comprise water from any source. Such aqueous fluids may comprise fresh water, salt water (e.g., water containing one or more salts dissolved therein), brine (e.g., saturated salt water), seawater, or any combination thereof. In most embodiments of the present disclosure, the aqueous fluids comprise one or more ionic species, such as those formed by salts dissolved in water. For example, seawater and/or produced water may comprise a variety of divalent cationic species dissolved therein. In certain embodiments, the density of the aqueous fluid can be adjusted, among other purposes, to provide additional particulate transport and suspension in the compositions of the present disclosure. In certain embodiments, the pH of the aqueous fluid may be adjusted (e.g., by a buffer or other pH adjusting agent) to a specific level, which may depend on, among other factors, the types of viscosifying agents, acids, and other additives included in the fluid. One of ordinary skill in the art, with the benefit of this disclosure, will recognize when such density and/or pH adjustments are appropriate.

In certain embodiments, the methods and compositions of the present disclosure optionally may comprise any number of additional additives. Examples of such additional additives include, but are not limited to, salts, additional surfactants, acids, proppant particulates, diverting agents, fluid loss control additives, gas, nitrogen, carbon dioxide, surface modifying agents, tackifying agents, foamers, additional corrosion inhibitors, scale inhibitors, catalysts, clay control agents, biocides, friction reducers, antifoam agents, bridging agents, flocculants, $H_2S$ scavengers, $CO_2$ scavengers, oxygen scavengers, lubricants, viscosifiers, breakers, weighting agents, relative permeability modifiers, resins, wetting agents, coating enhancement agents, filter cake removal agents, antifreeze agents (e.g., ethylene glycol), and the like. A person skilled in the art, with the benefit of this disclosure, will recognize the types of additives that may be included in the fluids of the present disclosure for a particular application.

The ethoxylated amine surfactants and compositions of the present disclosure can be used in a variety of applications. These include downhole applications (e.g., drilling, fracturing, completions, oil production), use in conduits, containers, and/or other portions of refining applications, gas separation towers/applications, pipeline treatments, water disposal and/or treatments, and sewage disposal and/or treatments.

In some embodiments, the present disclosure provides methods for using the additives, treatment fluids, and related compounds to carry out a variety of subterranean treatments, including but not limited to hydraulic fracturing treatments, acidizing treatments, and drilling operations. In some embodiments, the compounds of the present disclosure may be used in treating a portion of a subterranean formation, for example, in acidizing treatments such as matrix acidizing or fracture acidizing. In certain embodiments, a treatment fluid may be introduced into a subterranean formation. In some embodiments, the treatment fluid may be introduced into a wellbore that penetrates a subterranean formation. In some embodiments, the treatment fluid may be introduced at a pressure sufficient to create or enhance one or more fractures within the subterranean formation (e.g., hydraulic fracturing).

Treatment fluids can be used in a variety of subterranean treatment operations. As used herein, the terms "treat," "treatment," "treating," and grammatical equivalents thereof refer to any subterranean operation that uses a fluid in conjunction with achieving a desired function and/or for a desired purpose. Use of these terms does not imply any particular action by the treatment fluid. Illustrative treatment operations can include, for example, fracturing operations, gravel packing operations, acidizing operations, scale dissolution and removal, consolidation operations, and the like.

Certain embodiments of the methods and compositions disclosed herein may directly or indirectly affect one or more components or pieces of equipment associated with the preparation, delivery, recapture, recycling, reuse, and/or disposal of the disclosed compositions. For example, and with reference to FIG. 1, the disclosed methods and compositions may directly or indirectly affect one or more components or pieces of equipment associated with an exemplary fracturing system 10, according to one or more embodiments. In certain instances, the system 10 includes a fracturing fluid producing apparatus 20, a fluid source 30, a proppant source 40, and a pump and blender system 50 and resides at the surface at a well site where a well 60 is located. In certain instances, the fracturing fluid producing apparatus 20 combines a gel pre-cursor with fluid (e.g., liquid or substantially liquid) from fluid source 30, to produce a hydrated fracturing fluid that is used to fracture the formation. The hydrated fracturing fluid can be a fluid ready for use in a fracture stimulation treatment of the well 60 or a concentrate to which additional fluid is added prior to use in a fracture stimulation of the well 60. In some embodiments, the fracturing fluid producing apparatus 20 can be omitted and the fracturing fluid sourced directly from the fluid source 30. In certain embodiments, the fracturing fluid may comprise water, a hydrocarbon fluid, a polymer gel, foam, air, wet gases and/or other fluids.

The proppant source 40 can include a proppant for combination with the fracturing fluid. In certain embodiments, one or more treatment particulates of the present disclosure may be provided in the proppant source 40 and thereby combined with the fracturing fluid with the proppant. The system may also include additive source 70 that provides one or more additives (e.g., ethoxylated amine surfactants, gelling agents, weighting agents, and/or other additives) to alter the properties of the fracturing fluid. For example, the other additives 70 can be included to reduce pumping friction, to reduce or eliminate the fluid's reaction to the geological formation in which the well is formed, to operate as surfactants, inhibit corrosion, and/or to serve other functions. In certain embodiments, the other additives 70 may include an ethoxylated amine surfactant of the present disclosure.

The pump and blender system 50 receives the fracturing fluid and combines it with other components, including proppant from the proppant source 40 and/or additional fluid from the additives 70. The resulting mixture may be pumped down the well 60 under a pressure sufficient to create or enhance one or more fractures in a subterranean zone, for example, to stimulate production of fluids from the zone. Notably, in certain instances, the fracturing fluid producing apparatus 20, fluid source 30, and/or proppant source 40 may be equipped with one or more metering devices (not shown) to control the flow of fluids, proppant particles, and/or other compositions to the pumping and blender system 50. Such metering devices may permit the pumping and blender system 50 to source from one, some or all of the different sources at a given time, and may facilitate the preparation of fracturing fluids in accordance with the present disclosure using continuous mixing or "on-the-fly" methods. Thus, for example, the pumping and blender system 50 can provide just fracturing fluid into the well at some times, just proppant particles at other times, and combinations of those components at yet other times.

Figure 2:
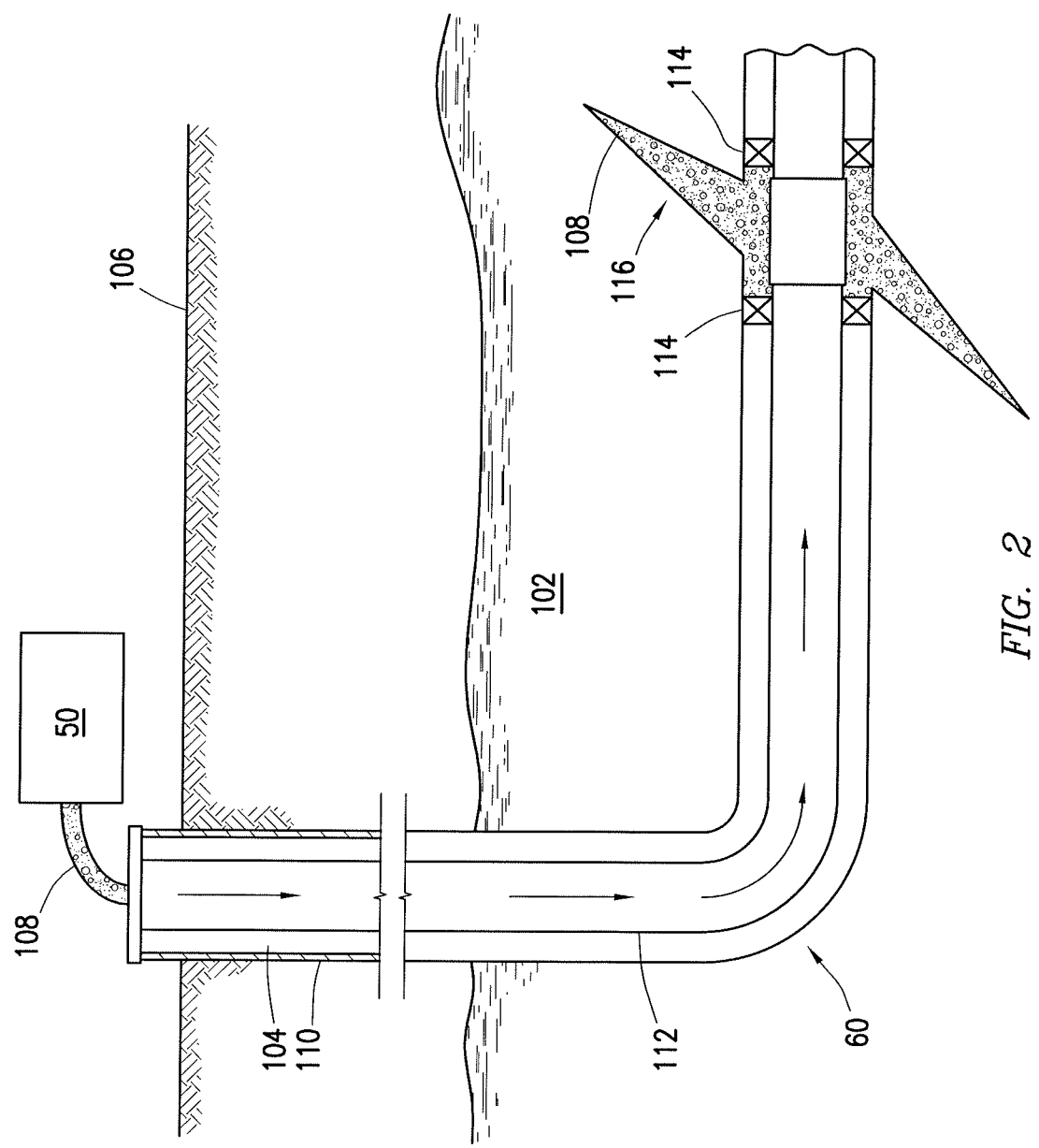
FIG. 2 is a diagram illustrating an example of a subterranean formation in which a fracturing operation may be performed in accordance with certain embodiments of the present disclosure.

FIG. 2 shows the well 60 during a fracturing operation in a portion of a subterranean formation of interest 102 surrounding a wellbore 104. The wellbore 104 extends from the surface 106, and the fracturing fluid 108 is applied to a portion of the subterranean formation 102 surrounding the horizontal portion of the wellbore. Although shown as vertical deviating to horizontal, the wellbore 104 may include horizontal, vertical, slant, curved, and other types of wellbore geometries and orientations, and the fracturing treatment may be applied to a subterranean zone surrounding any portion of the wellbore. The wellbore 104 can include a casing 110 that is cemented or otherwise secured to the wellbore wall. The wellbore 104 can be uncased or include uncased sections. Perforations can be formed in the casing 110 to allow fracturing fluids and/or other materials to flow into the subterranean formation 102. In cased wells, perforations can be formed using shape charges, a perforating gun, hydro-jetting and/or other tools.

The well is shown with a work string 112 depending from the surface 106 into the wellbore 104. The pump and blender system 50 is coupled a work string 112 to pump the fracturing fluid 108 into the wellbore 104. The working string 112 may include coiled tubing, jointed pipe, and/or other structures that allow fluid to flow into the wellbore 104. The working string 112 can include flow control devices, bypass valves, ports, and or other tools or well devices that control a flow of fluid from the interior of the working string 112 into the subterranean zone 102. For example, the working string 112 may include ports adjacent the wellbore wall to communicate the fracturing fluid 108 directly into the subterranean formation 102, and/or the working string 112 may include ports that are spaced apart from the wellbore wall to communicate the fracturing fluid 108 into an annulus in the wellbore between the working string 112 and the wellbore wall.

The working string 112 and/or the wellbore 104 may include one or more sets of packers 114 that seal the annulus between the working string 112 and wellbore 104 to define an interval of the wellbore 104 into which the fracturing fluid 108 will be pumped. FIG. 2 shows two packers 114, one defining an uphole boundary of the interval and one defining the downhole end of the interval. When the fracturing fluid 108 is introduced into wellbore 104 (e.g., in FIG. 2, the area of the wellbore 104 between packers 114) at a sufficient hydraulic pressure, one or more fractures 116 may be created in the subterranean zone 102. The proppant particulates (and/or treatment particulates of the present disclosure) in the fracturing fluid 108 may enter the fractures 116 where they may remain after the fracturing fluid flows out of the wellbore. These proppant particulates may "prop" fractures 116 such that fluids may flow more freely through the fractures 116.

While not specifically illustrated herein, the disclosed methods and compositions may also directly or indirectly affect any transport or delivery equipment used to convey the compositions to the fracturing system 10 such as, for example, any transport vessels, conduits, pipelines, trucks, tubulars, and/or pipes used to fluidically move the compositions from one location to another, any pumps, compressors, or motors used to drive the compositions into motion, any valves or related joints used to regulate the pressure or flow rate of the compositions, and any sensors (i.e., pressure and temperature), gauges, and/or combinations thereof, and the like.

To facilitate a better understanding of the present disclosure, the following examples of certain aspects of preferred embodiments are given. The following examples are not the only examples that could be given according to the present disclosure and are not intended to limit the scope of the disclosure or claims.

EXAMPLES

Example 1

Figure 3A:
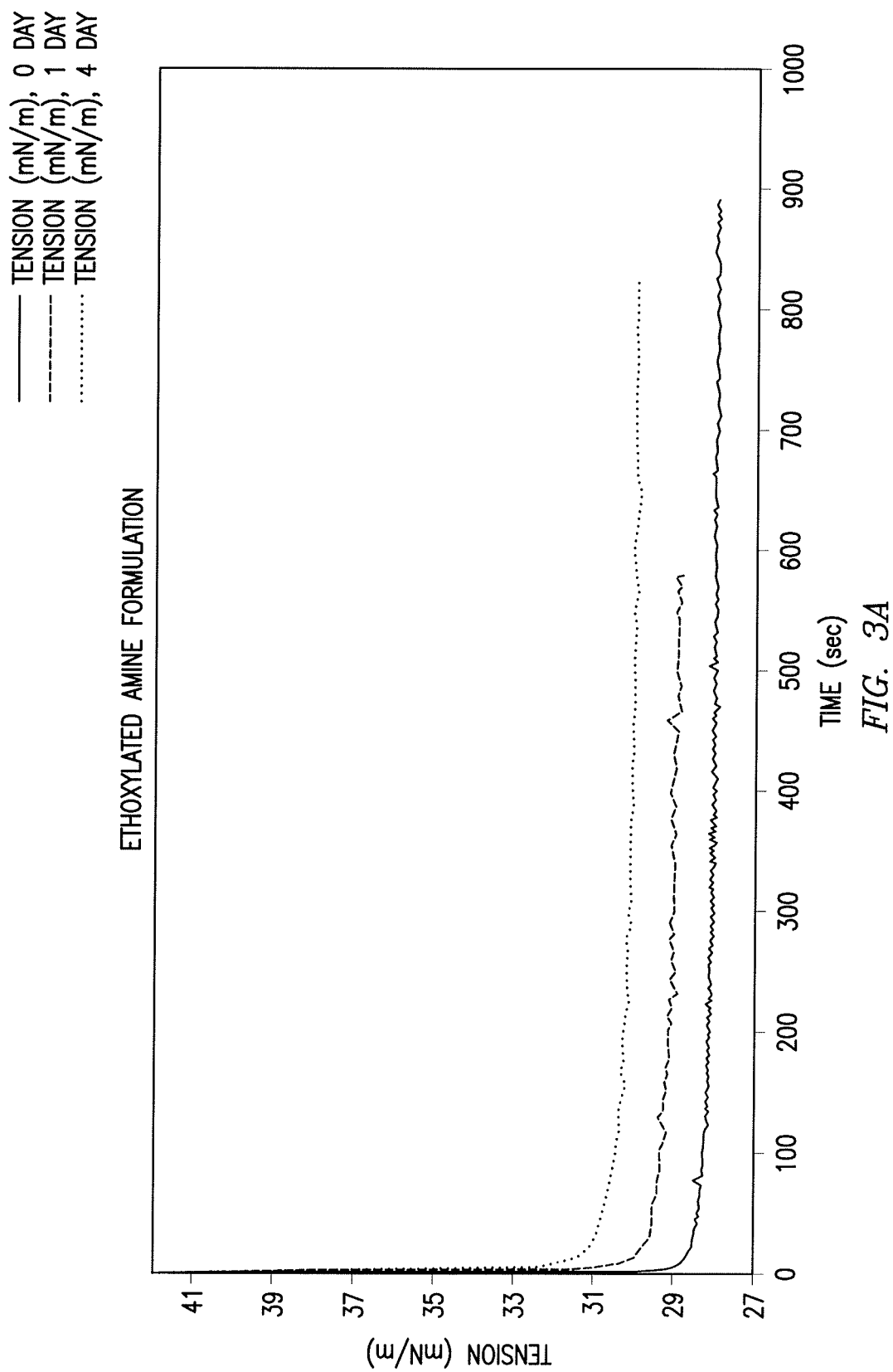
FIGS. 3A and 3B are graphs illustrating data relating to thermal stability of an ethoxylated amine formulation of the present disclosure and a field standard non-emulsifying surfactant formulation.
Figure 3B:
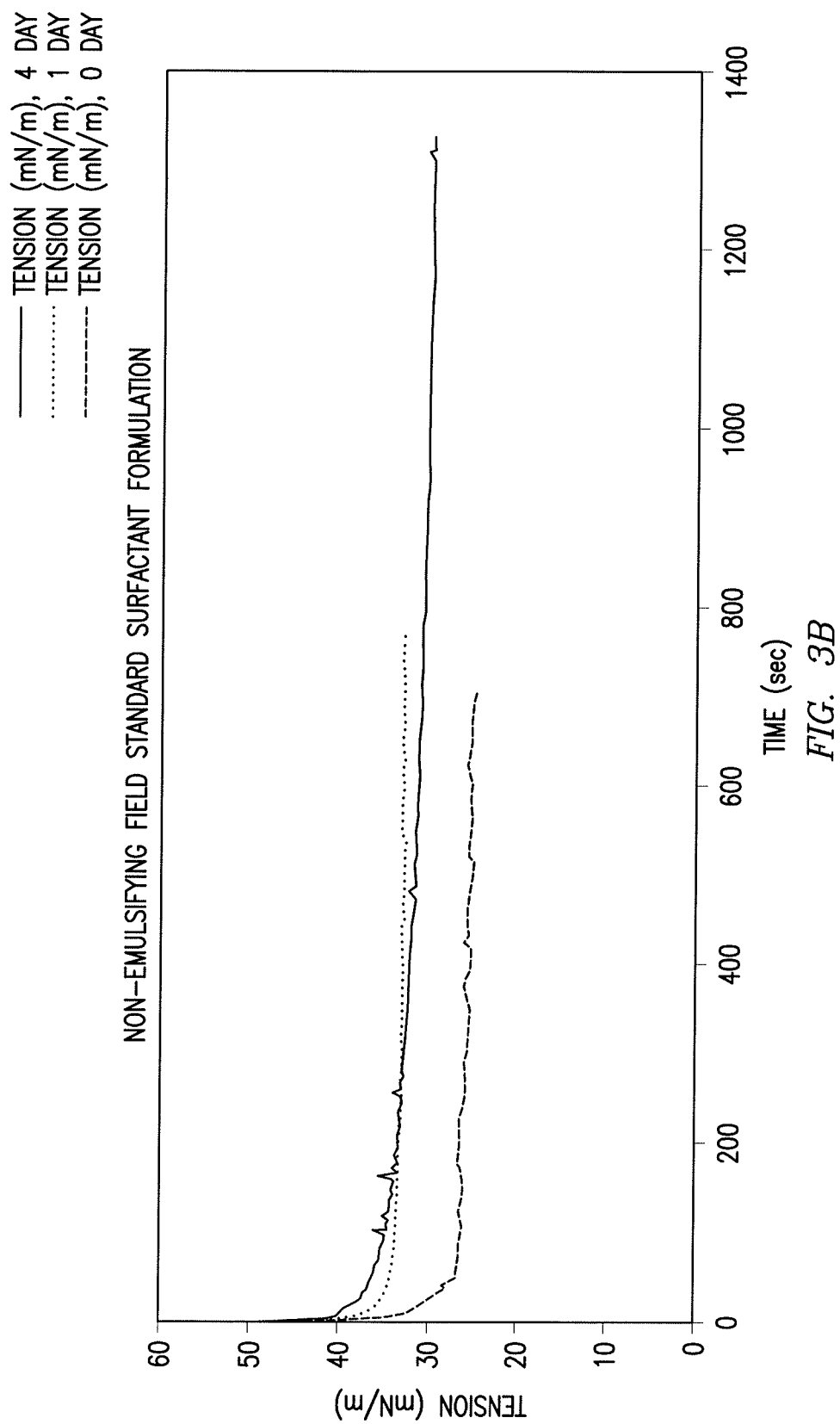

In this example, the thermal stability of an ethoxylated amine formulation was compared to a field standard non-emulsifying surfactant formulation. Thermal stability was tested by measuring the interfacial tensions of each composition at three different conditions: (1) at room temperature, (2) after heating and maintaining the composition at 320° F. and 300 psi for 1 day, and (3) after heating and maintaining the composition at 320° F. and 300 psi for 4 days. Interfacial tension measurements were obtained using a "Tracker H" Teclis Instruments automated drop tensiometer. FIGS. 3A and 3B show the interfacial tension measurements for each formulation at each condition. Table 1 shows the final interfacial tension for each formulation at each condition. As shown in FIGS. 3A and 3B and Table 1, the ethoxylated amine formulation was more stable to temperature variation than the field standard non-emulsifying surfactant formulation.

TABLE 1

| Surfactant Formulation | Interfacial Tension (mN/m) | | |
|---|---|---|---|
| | Room Temperature | 1 day at 320° F. & 300 psi | 4 days at 320° F. & 300 psi |
| Field Standard Non-Emulsifying Surfactant Formulation | 25.5 | 33.0 | 30.0 |
| Ethoxylated Amine Surfactant Formulation | 27.9 | 28.9 | 30.2 |

Example 2

In this example, an emulsion tendency test was performed to compare the emulsion tendency of an ethoxylated amine surfactant formulation in a 10% broken gel to a field standard non-emulsifying surfactant formulation in a 10% broken gel. The formulations were mixed with two different crude oils and observed at room temperature to determine how long after mixing the emulsion broke. The results of the emulsion tendency test are shown in Table 2. As shown in Table 2, the emulsion break time for the ethoxylated amine surfactant formulation was comparable to the field standard non-emulsifying surfactant formulation.

TABLE 2

| Surfactant Formulation | Emulsion Break Time (min) | |
|---|---|---|
| | Crude Oil 1 | Crude Oil 2 |
| Field Standard Non-Emulsifying Surfactant Formulation | 1 | 2.5 |
| Ethoxylated Amine Surfactant Formulation | 3 | 1 |

Example 3

Figure 4:
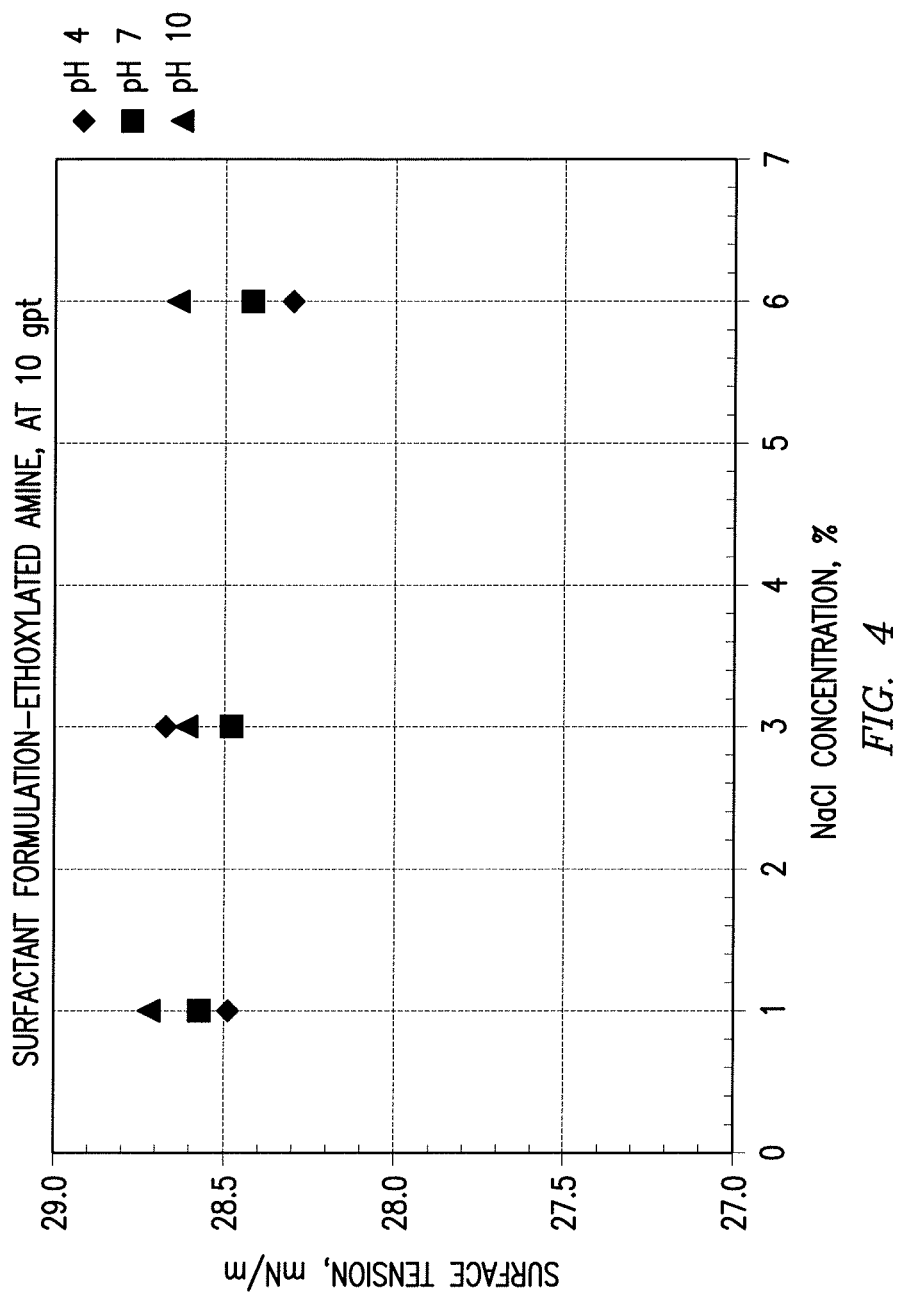
FIG. 4 is a graph illustrating data relating to pH and salinity stability of an ethoxylated amine formulation.

In this example, pH and salinity stability was measured for an ethoxylated amine formulation. Ethoxylated amine formulations comprising varying concentrations of NaCl (1 percent, 3 percent, and 6 percent) were prepared at three different pH levels (4, 7, and 10), and surface tension was measured for each. The results of the surface tension measurements are shown in FIG. 4, which shows that surface tension of the ethoxylated amine formulation was stable with respect to pH and salinity variations.

An embodiment of the present disclosure is a method comprising: providing a treatment fluid comprising: an aqueous base fluid; and a surfactant comprising an ethoxylated amine or derivative thereof; introducing the treatment fluid into a wellbore penetrating at least a portion of a subterranean formation; and producing fluids from the wellbore during or subsequent to introducing the treatment fluid into the wellbore.

Another embodiment of the present disclosure is a method comprising providing a treatment fluid comprising: an aqueous base fluid; and a surfactant comprising an ethoxylated amine or derivative thereof; and introducing the treatment fluid into a wellbore penetrating at least a portion of a subterranean formation at or above a pressure sufficient to create or enhance one or more fractures in the subterranean formation.

Another embodiment of the present disclosure is a method comprising providing a treatment fluid comprising: an aqueous base fluid; and a surfactant comprising an ethoxylated amine or derivative thereof; introducing the treatment fluid into a wellbore penetrating at least a portion of a subterranean formation comprising an unconventional reservoir; and producing fluids from the wellbore during or subsequent to introducing the treatment fluid into the wellbore, wherein the amount of fluids produced from the wellbore during or subsequent to introducing the treatment fluid comprising the surfactant is greater than the amount of fluids that would be produced during or subsequent to introducing the same treatment fluid without the surfactant.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. While numerous changes may be made by those skilled in the art, such changes are encompassed within the spirit of the subject matter defined by the appended claims. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. In particular, every range of values (e.g., "from about a to about b," or, equivalently, "from approximately a to b," or, equivalently, "from approximately a-b") disclosed herein is to be understood as referring to the power set (the set of all subsets) of the respective range of values. The terms in the claims have their plain, ordinary meaning unless otherwise explicitly and clearly defined by the patentee.

What is claimed is:

1. A method comprising:
    providing a treatment fluid comprising:
        an aqueous base fluid;
        a first surfactant comprising an ethoxylated amine or derivative thereof;
        a second surfactant comprising an ethoxylated alcohol or a salt of an ethoxylated alcohol;
        a third surfactant selected from the group consisting of an alkoxylated alkyl alcohol, an alkoxylated alkyl alcohol salt, an alkyl sulfonate, an aryl sulfonate, a sulfate, a phosphate, a carboxylate, a polyoxyalkyl glycol, a polyoxyethylene glycol sorbitan alkyl ester, a sorbitan alkyl ester, a polysorbate, a glucoside, a quaternary amine compound, and any combination thereof; and
        a solvent comprising glycerine and acetone;
    introducing the treatment fluid into a wellbore penetrating at least a portion of a subterranean formation; and
    producing fluids from the wellbore during or subsequent to introducing the treatment fluid into the wellbore.

2. The method of claim 1, wherein the ethoxylated amine or derivative thereof inhibits corrosion in at least a portion of the subterranean formation.

3. The method of claim 1, wherein the first surfactant is present in the treatment fluid in an amount from about $1 \times 10^{-5}$ gpt up to about 50 gpt based on the total volume of the treatment fluid.

4. The method of claim 1, wherein the treatment fluid further comprises an additional surfactant.

5. The method of claim 1, wherein the treatment fluid further comprises an additional solvent.

6. The method of claim 5, wherein the additional solvent is selected from the group consisting of: a non-aqueous solvent, a non-aromatic solvent, an alcohol, glycerol, carbon dioxide, isopropanol, any combination, and any derivative thereof.

7. The method of claim 1, wherein the subterranean formation comprises an unconventional reservoir.

8. The method of claim 1, further comprising:
allowing at least one of the surfactants to reduce capillary pressure in at least a portion of the subterranean formation.

9. The method of claim 1, wherein the amount of fluids produced from the wellbore during or subsequent to introducing the treatment fluid comprising the surfactants is greater than the amount of fluids that would be produced during or subsequent to introducing the same treatment fluid without the surfactants.

10. The method of claim 1, further comprising:
allowing at least one of the surfactants to alter a wettability of a surface of the formation.

11. The method of claim 1, further comprising:
allowing at least one of the surfactants to reduce interfacial tension between a fluid in the formation and a surface of the formation.

12. The method of claim 1, further comprising:
allowing at least one of the surfactants to remove at least a portion of an oil block, a water block, or both.

13. A method comprising:
providing a treatment fluid comprising:
an aqueous base fluid;
a first surfactant comprising an ethoxylated amine or derivative thereof;
a second surfactant comprising an ethoxylated alcohol or a salt of an ethoxylated alcohol;
a third surfactant selected from the group consisting of an alkoxylated alkyl alcohol, an alkoxylated alkyl alcohol salt, an alkyl sulfonate, an aryl sulfonate, a sulfate, a phosphate, a carboxylate, a polyoxyalkyl glycol, a polyoxyethylene glycol sorbitan alkyl ester, a sorbitan alkyl ester, a polysorbate, a glucoside, a quaternary amine compound, and any combination thereof; and
a solvent comprising glycerine and acetone;
introducing the treatment fluid into a wellbore penetrating at least a portion of a subterranean formation at or above a pressure sufficient to create or enhance one or more fractures in the subterranean formation.

14. The method of claim 13, further comprising:
producing fluids from the wellbore.

15. The method of claim 13, further comprising:
allowing at least one of the surfactants to reduce capillary pressure in at least a portion of the subterranean formation.

16. The method of claim 13, further comprising:
allowing at least one of the surfactants to remove at least a portion of an oil block, a water block, or both.

17. The method of claim 13, wherein the subterranean formation comprises an unconventional reservoir.

18. A method comprising:
providing a treatment fluid comprising:
an aqueous base fluid;
a first surfactant comprising an ethoxylated amine or derivative thereof;
a second surfactant comprising an ethoxylated alcohol or a salt of an ethoxylated alcohol;
a third surfactant selected from the group consisting of an alkoxylated alkyl alcohol, an alkoxylated alkyl alcohol salt, an alkyl sulfonate, an aryl sulfonate, a sulfate, a phosphate, a carboxylate, a polyoxyalkyl glycol, a polyoxyethylene glycol sorbitan alkyl ester, a sorbitan alkyl ester, a polysorbate, a glucoside, a quaternary amine compound, and any combination thereof; and
a solvent comprising glycerine and acetone;
introducing the treatment fluid into a wellbore penetrating at least a portion of a subterranean formation comprising an unconventional reservoir; and
producing fluids from the wellbore during or subsequent to introducing the treatment fluid into the wellbore, wherein the amount of fluids produced from the wellbore during or subsequent to introducing the treatment fluid comprising the surfactant is greater than the amount of fluids that would be produced during or subsequent to introducing the same treatment fluid without the surfactant.

19. The method of claim 18, further comprising:
allowing at least one of the surfactants to remove at least a portion of an oil block, a water block, or both.

* * * * *